United States Patent
An et al.

(10) Patent No.: US 12,540,241 B2
(45) Date of Patent: *Feb. 3, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Yong Hee An, Daejeon (KR); Chun Ho Park, Daejeon (KR); Jeongmin Jang, Daejeon (KR); Tae Hoon Kim, Daejeon (KR); Daeun Sung, Daejeon (KR); Wangrae Joe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 388 days.

This patent is subject to a terminal disclaimer.

(21) Appl. No.: 17/789,830

(22) PCT Filed: Dec. 14, 2021

(86) PCT No.: PCT/KR2021/019008
§ 371 (c)(1),
(2) Date: Jun. 29, 2022

(87) PCT Pub. No.: WO2022/158719
PCT Pub. Date: Jul. 28, 2022

(65) Prior Publication Data
US 2023/0242752 A1    Aug. 3, 2023

(30) Foreign Application Priority Data
Jan. 22, 2021 (KR) .................. 10-2021-0009295

(51) Int. Cl.
*C08L 51/04* (2006.01)
*C08F 265/04* (2006.01)
(Continued)

(52) U.S. Cl.
CPC ............ *C08L 51/04* (2013.01); *C08F 265/04* (2013.01); *C08L 25/12* (2013.01)

(58) Field of Classification Search
CPC ......... C08L 51/04; C08L 25/12; C08F 265/04
See application file for complete search history.

(56) References Cited

U.S. PATENT DOCUMENTS

| 4,885,335 A | 12/1989 | Gallucci et al. | |
|---|---|---|---|
| 2003/0236350 A1* | 12/2003 | Berzinis ................ | C08F 265/04 525/71 |

(Continued)

FOREIGN PATENT DOCUMENTS

| CN | 101360770 A | 2/2009 |
|---|---|---|
| CN | 108699315 A | 10/2018 |

(Continued)

OTHER PUBLICATIONS

International Search Report and Written Opinion issued in corresponding International Patent Application No. PCT/KR2021/019008, dated Mar. 24, 2022.

(Continued)

*Primary Examiner* — Joseph S Del Sole
*Assistant Examiner* — David L Miller
(74) *Attorney, Agent, or Firm* — Morgan, Lewis & Bockius LLP

(57) ABSTRACT

The present disclosure relates to a thermoplastic resin composition, a method of preparing the same, and a molded article including the same. More particularly, the present disclosure relates to a thermoplastic resin composition including 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound (Continued)

copolymer (B) having a weight average molecular weight of 50,000 to 180,000 g/mol, wherein the thermoplastic resin composition has an alkyl acrylate coverage value (X) of 70% or more as calculated by Equation 1.

10 Claims, 1 Drawing Sheet

(51) Int. Cl.
*C08L 25/04* (2006.01)
*C08L 25/12* (2006.01)

(56) References Cited

U.S. PATENT DOCUMENTS

| | | |
|---|---|---|
| 2006/0089462 A1 | 4/2006 | O et al. |
| 2007/0287799 A1 | 12/2007 | Ha et al. |
| 2018/0142094 A1* | 5/2018 | Kang .................... C08F 265/04 |
| 2019/0023893 A1 | 1/2019 | Park et al. |
| 2019/0185655 A1 | 6/2019 | Park et al. |
| 2019/0382574 A1 | 12/2019 | An et al. |
| 2020/0283614 A1 | 9/2020 | Kim et al. |
| 2022/0356340 A1* | 11/2022 | Park ...................... C08L 51/003 |
| 2022/0372269 A1* | 11/2022 | Jeon ........................ C08L 33/12 |
| 2025/0092240 A1* | 3/2025 | Jo ........................... C08L 25/16 |

FOREIGN PATENT DOCUMENTS

| | | | | |
|---|---|---|---|---|
| CN | 109071912 A | 12/2018 | | |
| JP | H0733470 B2 | 4/1995 | | |
| JP | 2002-138118 A | 5/2002 | | |
| JP | 2006335960 A | * 12/2006 | ............ | C08F 265/00 |
| JP | 2007-177060 A | 7/2007 | | |
| JP | 2019-014815 A | 1/2019 | | |
| KR | 10-2004-0049066 A | 6/2004 | | |
| KR | 10-2007-0117315 A | 12/2007 | | |
| KR | 10-0815995 B1 | 3/2008 | | |
| KR | 10-2012-0029156 A | 3/2012 | | |
| KR | 10-1200644 B1 | 11/2012 | | |
| KR | 10-2018-0023492 A | 3/2018 | | |
| KR | 10-2018-0052333 A | 5/2018 | | |
| KR | 10-2018-0131992 A | 12/2018 | | |
| KR | 10-2019-0065944 A | 6/2019 | | |
| KR | 10-2019-0073323 A | 6/2019 | | |
| KR | 10-2020-0089101 A | 7/2020 | | |
| WO | WO-2022010053 A1 * | 1/2022 | ........ | C08F 220/1804 |
| WO | WO-2022035071 A1 * | 2/2022 | ................ | C08F 2/22 |

OTHER PUBLICATIONS

Extended European Search Report issued in corresponding European Patent Application No. 21 904 622.4. dated, Jan. 3, 2023.

* cited by examiner

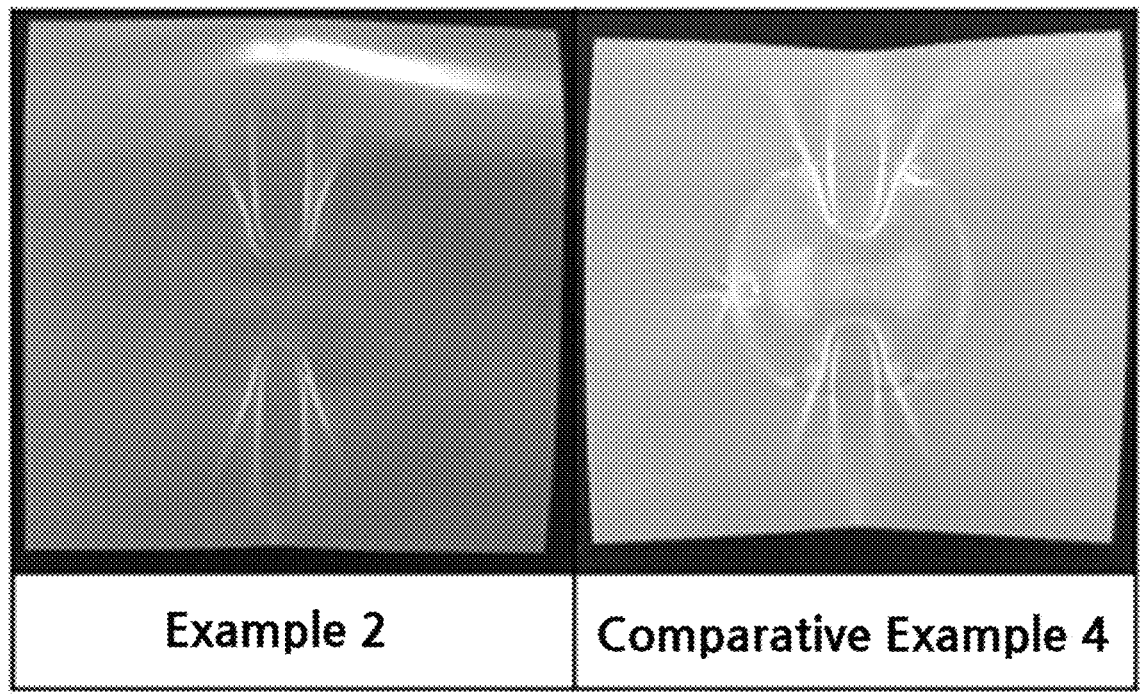

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application claims priority to Korean Patent Application No. 10-2021-0009295, filed on Jan. 22, 2021 in the Korean Intellectual Property Office, the disclosure of which is incorporated herein by reference.

TECHNICAL FIELD

The present invention relates to a thermoplastic resin composition, a method of preparing the same, and a molded article including the same. More particularly, the present invention relates to a thermoplastic resin composition that has excellent mechanical properties, such as impact strength, tensile strength, and elongation, transparency, colorability, and processability and is capable of preventing occurrence of whitening during bending due to excellent non-whitening properties, a method of preparing the thermoplastic resin composition, and a molded article including the thermoplastic resin composition.

BACKGROUND ART

Polyvinyl chloride resins (hereinafter referred to as "PVC resins") and polyethylene terephthalate resins (hereinafter referred to as "PET resins") have excellent moldability. In addition, compared to painting, a process of preparing these resins is easy. Accordingly, these resins have been used in the manufacture of decorative sheets for furniture or interiors. However, in the case of PVC resins, hydrogen chloride gas generated in a combustion process and a large amount of plasticizer added to increase flexibility may be harmful to the human body. In the case of PET resins, due to poor weather resistance, appearance may deteriorate due to yellowing over time.

Acrylate-styrene-acrylonitrile copolymers (hereinafter referred to as "ASA resins") including alkyl acrylate compounds have good weather resistance, aging resistance, chemical resistance, rigidity, impact resistance, and processability, and are widely used in various fields such as automobiles, miscellaneous goods, and construction materials due to broad applicability thereof. In addition, the application range of the ASA resins is continuously increasing.

In addition, as the importance of aesthetics increases in the market, research is being conducted on a method of finishing the surface of a substrate, such as an acrylonitrile-butadiene-styrene resin, a PVC resin, a PET resin, and an iron plate, with an ASA resin composition to realize an aesthetically pleasing appearance and excellent colorability and weather resistance.

However, due to the characteristics of ASA resins, when finishing treatment is performed at room temperature, whitening occurs on the surface of a product during processing such as cutting, bending, and molding depending on the shape of the product, resulting in loss of original color and deterioration of appearance. This whitening is caused by voids generated due to cracks inside an ASA resin. To solve this problem, a method of softening a resin by increasing a rubber content has been used. However, there are limitations in use due to mechanical properties different from those of a conventional ASA resin composition.

Therefore, there is a need to develop a thermoplastic resin composition having excellent transparency and colorability, having mechanical properties and surface hardness similar to those of conventional ASA resin compositions, and being capable of preventing occurrence of whitening.

RELATED ART DOCUMENTS

Patent Documents

Japanese Patent No. 1995-033470

DISCLOSURE

Technical Problem

Therefore, the present invention has been made in view of the above problems, and it is one object of the present invention to provide a thermoplastic resin composition that has excellent mechanical properties, such as impact strength, tensile strength, and elongation, transparency, colorability, and processability and is capable of preventing occurrence of whitening during bending due to excellent non-whitening properties.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 35 to 75% by weight of an alkyl acrylate-aromatic vinyl compound-vinyl cyanide compound graft copolymer (A) containing alkyl acrylate rubber having an average particle diameter of 40 to 120 nm; and 25 to 65% by weight of an aromatic vinyl compound-vinyl cyanide compound copolymer (B) having a weight average molecular weight of 50,000 to 180,000 g/mol, wherein the thermoplastic resin composition has an alkyl acrylate coverage value (X) of 70% or more as calculated by Equation 1 below:

$$X=\{(G-Y)/Y\}\times 100, \qquad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a thermoplastic resin composition including 35 to 75% by weight of an alkyl acrylate-aromatic vinyl compound-vinyl cyanide compound graft copolymer (A) containing alkyl acrylate rubber having an average particle diameter of 40 to 120 nm; and 25 to 65% by weight of an aromatic vinyl compound-vinyl cyanide compound copolymer (B) having a weight average molecular weight of 50,000 to 180,000 g/mol, wherein the graft copolymer (A) includes 20 to 60% by weight of alkyl acrylate rubber and 40 to 60% by weight of an aromatic vinyl compound-vinyl cyanide compound copolymer.

In accordance with another aspect of the present invention, provided is a method of preparing a thermoplastic resin composition, the method including kneading and extruding, at 200 to 300° C. and 100 to 500 rpm, 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound copolymer (B) having a weight average molecular weight of 50,000 to 180,000 g/mol, wherein the thermoplastic resin composition has an alkyl acrylate coverage value (X) of 70% or more as calculated by Equation 1 below:

$$X=\{(G-Y)/Y\}\times 100, \quad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a method of preparing a thermoplastic resin composition, the method including kneading and extruding, at 200 to 300° C. and 100 to 500 rpm, 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound copolymer (B) having a weight average molecular weight of 50,000 to 180,000 g/mol, wherein the graft copolymer (A) includes 20 to 60% by weight of alkyl acrylate rubber and 60 to 80% by weight of an aromatic vinyl compound-vinyl cyanide compound.

In accordance with yet another aspect of the present invention, provided is a molded article including the thermoplastic resin composition.

Advantageous Effects

According to the present invention, the present invention has an effect of providing a thermoplastic resin composition that has excellent mechanical properties, such as impact strength, tensile strength, and elongation, transparency, colorability, and processability and is capable of preventing occurrence of whitening during bending due to excellent non-whitening properties, a method of preparing the thermoplastic resin composition, and a molded article including the thermoplastic resin composition.

DESCRIPTION OF DRAWINGS

FIG. 1 includes images taken after ball dropping-induced impact is applied to T-die extrusion films manufactured in Example 2 and Comparative Example 4.

BEST MODE

Hereinafter, a thermoplastic resin composition, a method of preparing the same, and a molded article including the same according to the present invention will be described in detail.

The present inventors confirmed that, when an alkyl acrylate-aromatic vinyl compound-vinyl cyanide compound graft copolymer containing rubber having a predetermined average particle diameter and an aromatic vinyl compound-vinyl cyanide compound copolymer were mixed in a predetermined composition ratio and an alkyl acrylate coverage value was adjusted within a predetermined range, mechanical properties, transparency, and colorability were improved, and whitening did not occur during processing such as cutting, bending, or molding. Based on these results, the present inventors conducted further studies to complete the present invention.

The thermoplastic resin composition of the present invention includes 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound copolymer (B) having a weight average molecular weight of 50,000 to 180,000 g/mol, wherein the thermoplastic resin composition has an alkyl acrylate coverage value (X) of 70% or more as calculated by Equation 1 below.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In this case, mechanical properties, such as impact strength, tensile strength, and elongation, transparency, colorability, and processability may be excellent. In particular, due to excellent non-whitening properties, occurrence of whitening during bending may be prevented.

Hereinafter, each component constituting the thermoplastic resin composition of the present invention will be described in detail.

(A) Alkyl Acrylate-Aromatic Vinyl Compound-Vinyl Cyanide Compound Graft Copolymer For example, the graft copolymer (A) may contain alkyl acrylate rubber having an average particle diameter of 40 to 120 nm, preferably 50 to 120 nm, more preferably 60 to 120 nm, still more preferably 70 to 120 nm, still more preferably 80 to 110 nm. Within this range, a finally prepared thermoplastic resin composition may have excellent impact strength, light resistance, and gloss.

In this description, the average particle diameter may be measured by dynamic light scattering, and specifically, may be measured as an intensity value using a particle size analyzer (product name: Nicomp 380, manufacturer: PSS) in a Gaussian mode. As a specific measurement example, a sample may be prepared by diluting 0.1 g of latex (total solids content: 35 to 50 wt %) 1,000 to 5,000-fold with distilled water, and average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 psec.

For example, based on a total weight of the components (A) and (B), the graft copolymer (A) may be included in an amount of 35 to 75% by weight, preferably 45 to 65% by weight, more preferably 55 to 65% by weight. Within this range, mechanical properties, such as impact strength, tensile strength, and flexural strength, gloss, and surface hardness may be excellent.

For example, the graft copolymer (A) may include 20 to 60% by weight of alkyl acrylate rubber (a-1) and 40 to 80% by weight of an aromatic vinyl compound-vinyl cyanide compound copolymer (a-2), preferably 30 to 50% by weight of alkyl acrylate rubber (a-1) and 50 to 70% by weight of an aromatic vinyl compound-vinyl cyanide compound copolymer (a-2), more preferably 40 to 50% by weight of alkyl acrylate rubber (a-1) and 50 to 60% by weight of an aromatic vinyl compound-vinyl cyanide compound copolymer (a-2). Within this range, mechanical properties, gloss, and surface hardness may be excellent.

In this description, a polymer including a certain compound means a polymer prepared by polymerizing the compound, and a unit in the polymer is derived from the compound.

For example, the alkyl acrylate rubber (a-1) may further include an aromatic vinyl compound. In this case, chemical resistance and impact resistance may be further improved. For example, based on 100% by weight in total of the acrylate rubber, the alkyl acrylate rubber (a-1) may include the aromatic vinyl compound in an amount of 0.1 to 35% by weight, preferably 1 to 32% by weight, more preferably 5 to 30% by weight, still more preferably 10 to 20% by weight. Within this range, mechanical properties, gloss, and surface hardness may be excellent without deterioration of physical properties.

For example, the copolymer (a-2) may further include alkyl acrylate. In this case, physical property balance between impact resistance, weather resistance, processability, and non-whitening properties may be excellent.

For example, based on 100% by weight in total of the copolymer (a-2), the copolymer (a-2) may include 55 to 85% by weight of an aromatic vinyl compound, 10 to 30% by weight of a vinyl cyanide compound, and 0.1 to 35% by weight of alkyl acrylate, preferably 60 to 80% by weight of an aromatic vinyl compound, 15 to 25% by weight of a vinyl cyanide compound, and 1 to 25% by weight of alkyl acrylate, more preferably 60 to 75% by weight of an aromatic vinyl compound, 15 to 22% by weight of a vinyl cyanide compound, and 5 to 22% by weight of alkyl acrylate. Within this range, impact resistance and weather resistance may be further improved.

For example, the graft copolymer (A) may be prepared by emulsion polymerization. In this case, gloss and surface hardness may be excellent.

Emulsion polymerization methods commonly practiced in the art to which the present invention pertains may be used in the present invention without particular limitation.

For example, the alkyl acrylate may be an alkyl acrylate containing an alkyl group having 1 to 15 carbon atoms, preferably includes one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate. More preferably, the alkyl acrylate is an alkyl acrylate having 2 to 8 carbon atoms, still more preferably butyl acrylate, ethylhexyl acrylate, or a mixture thereof, still more preferably butyl acrylate.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably one or more selected from the group consisting of styrene and α-methyl styrene, more preferably styrene. In this case, processability may be excellent due to proper fluidity, and mechanical properties such as impact resistance may be excellent.

For example, the vinyl cyanide compound may include one or more selected from the group consisting of acrylonitrile, methacrylonitrile, ethylacrylonitrile, and isopropylacrylonitrile, preferably acrylonitrile.

For example, the graft copolymer (A) may have a grafting degree of 60% or more, preferably 60 to 150%, more preferably 65 to 140%, still more preferably 65 to 130%, still more preferably 65 to 120% as calculated by Equation 3 below. Within this range, gloss, colorability, and transparency may be excellent.

Grafting degree(%)=[Weight (g)of grafted monomers/Rubber weight(g)]×100  [Equation 3]

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

When the weight of insoluble matter (gel) is measured, 0.5 g of powdered graft copolymer (A) is added to 50 ml of acetone, followed by stirring at room temperature for 12 hours. Then, centrifugation is performed to separate insoluble matter that is not dissolved in acetone, followed by drying for 12 hours. Then, the weight of the insoluble matter (gel) is measured. The rubber weight (g) is the weight (g) of rubber components theoretically added to 0.5 g of the powdered graft copolymer (A).

As a specific measurement example, when measuring the weight of insoluble matter (gel), 0.5 g of a powdered graft copolymer is added to 50 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the weight of the insoluble matter (gel) is measured.

(B) Aromatic Vinyl Compound-Vinyl Cyanide Compound Copolymer

For example, based on a total weight of the components (A) and (B), the aromatic vinyl compound-vinyl cyanide compound copolymer (B) may be included in an amount of 25 to 65% by weight, preferably 35 to 55% by weight, more preferably 40 to 50% by weight. Within this range, mechanical properties, such as impact strength, tensile strength, and flexural strength, surface hardness, transparency, and colorability may be excellent. In particular, due to excellent non-whitening properties, occurrence of whitening during bending may be prevented.

For example, the aromatic vinyl compound-vinyl cyanide compound copolymer (B) may have a weight average molecular weight of 50,000 to 180,000 g/mol, preferably 60,000 to 180,000 g/mol, more preferably 100,000 to 180,000 g/mol. Within this range, weather resistance, tensile strength, and impact strength may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 µl, column model: 1×PLgel 10 µm MiniMix-B (250×4.6 mm)+

1×PLgel 10 µm MiniMix-B (250×4.6 mm)+1×PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method: OECD TG 118.

For example, the aromatic vinyl compound-vinyl cyanide compound copolymer (B) may include 55 to 85% by weight of an aromatic vinyl compound and 15 to 45% by weight of a vinyl cyanide compound, preferably 60 to 80% by weight of an aromatic vinyl compound and 20 to 40% by weight of a vinyl cyanide compound, more preferably 65 to 75% by weight of an aromatic vinyl compound and 25 to 35% by weight of a vinyl cyanide compound. In this case, processability, gloss, and non-whitening properties may be excellent.

The aromatic vinyl compound-vinyl cyanide compound copolymer (B) is preferably a styrene-acrylonitrile copolymer (SAN resin), an α-methylstyrene-acrylonitrile copolymer (heat-resistant SAN resin), or a mixture thereof, more preferably a styrene-acrylonitrile copolymer (SAN resin). In this case, processability during calendering or extrusion may be excellent, and transparency may be excellent.

The types of the aromatic vinyl compound and the vinyl cyanide compound included in the aromatic vinyl compound-vinyl cyanide compound copolymer (B) may be the same as the types of the aromatic vinyl compound and the vinyl cyanide compound included in the graft copolymer (A) of the present invention.

The aromatic vinyl compound-vinyl cyanide compound copolymer (B) may be prepared by solution polymerization, bulk polymerization, emulsion polymerization, or suspension polymerization, preferably bulk polymerization. In this case, heat resistance and fluidity may be excellent.

Solution polymerization, bulk polymerization, emulsion polymerization, and suspension polymerization commonly practiced in the art to which the present invention pertains may be used in the present invention without particular limitation.

Thermoplastic Resin Composition

The thermoplastic resin composition of the present invention preferably has an alkyl acrylate coverage value (X) of 70% or more, preferably 70 to 150%, more preferably 70 to 140%, still more preferably 70 to 135%, still more preferably 75 to 130%, still more preferably 80 to 130%, still more preferably 85 to 110% as calculated by Equation 1 below. Within this range, transparency and colorability may be excellent. In particular, due to excellent non-whitening properties, occurrence of whitening during bending may be prevented.

$$X=\{(G-Y)/Y\}\times 100 \quad [\text{Equation 1}]$$

In Equation 1, G represents a gel content (wt %) based on a total weight of the thermoplastic resin composition, and Y represents the content (wt %) of an alkyl acrylate in the gel based on a total weight of the thermoplastic resin composition.

In Equation 1, the content of the alkyl acrylate in the gel of the thermoplastic resin composition is the content of an alkyl acrylate (based on 100% by weight in total of the added thermoplastic resin composition) in insoluble matter obtained in the process of measuring the gel content. Here, the gel content is the content of insoluble matter based on 100% by weight in total of the thermoplastic resin composition.

The content of an alkyl acrylate in the gel may be measured using an $^1$NMR analyzer or through FT-IR.

When measuring the gel content, 1 g of a thermoplastic resin composition is added to 30 g of acetone, followed by stirring at room temperature for 12 hours. Then, centrifugation is performed to separate insoluble matter that is not dissolved in acetone, followed by drying for 12 hours. Then, the gel content is measured and calculated by Equation 2 below. As a specific measurement example, when measuring the gel content, 1 g of a thermoplastic resin composition is added to 30 g of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the gel content is measured.

$$\text{Gel content}(\%)=[\text{Weight (g) of insoluble matter (gel)/Weight (g) of sample}]\times 100 \quad [\text{Equation 2}]$$

In this description, the alkyl acrylate coverage value is a parameter for measuring the degree of dispersion of an aromatic vinyl compound-vinyl cyanide compound polymer grafted onto alkyl acrylate rubber in the thermoplastic resin composition. When the alkyl acrylate coverage value is high, the aromatic vinyl compound-vinyl cyanide compound polymer is evenly grafted onto the alkyl acrylate rubber to cover the alkyl acrylate rubber uniformly, thereby increasing gloss and achieving excellent tensile strength, colorability and non-whitening properties. In addition, as the alkyl acrylate coverage value increases, the distance between rubber particles is decreased, thereby reducing voids due to cracks occurring inside the thermoplastic resin composition and suppressing whitening during bending.

Here, the alkyl acrylate coverage value indicates the degree of dispersion of the aromatic vinyl compound-vinyl cyanide compound polymer grafted onto the alkyl acrylate in the thermoplastic resin composition, and the grafting degree indicates a degree to which the aromatic vinyl compound-vinyl cyanide compound polymer is grafted onto the alkyl acrylate in an alkyl acrylate-aromatic vinyl compound-vinyl cyanide compound graft copolymer.

In addition, the alkyl acrylate coverage value is obtained by calculating the content of the alkyl acrylate present in the thermoplastic resin composition using an $^1$NMR analyzer or through FT-IR, and the grafting degree is obtained based on the content of rubber components added during polymerization.

For example, the thermoplastic resin composition may have an Izod impact strength (specimen thickness: ¼", room temperature) of 3 kgf·cm/cm or more, preferably 3.5 to 9 kgf·cm/cm, more preferably 4 to 8.5 kgf·cm/cm, still more preferably 4.5 to 8 kgf·cm/cm as measured according to ASTM D256. Within this range, physical property balance and non-whitening properties may be excellent.

In this description, the room temperature may be a temperature within 20±5° C.

For example, when a 1 kg weight is vertically dropped onto an extruded film having dimensions of 0.15 mm×10 cm×10 cm in thickness, width, and length from a height of 25 cm using a Gardner impact tester, haze values before and after impact are measured for a portion of the film hit by the weight according to ASTM D1003, and a difference in the haze values is calculated, the thermoplastic resin composition may have a haze difference (Δhaze) of 10 or less, preferably 7 or less, more preferably 5 or less, still more preferably 0.1 to 5, still more preferably 0.1 to 4.5, still more preferably 0.1 to 4. In this case, since the thermoplastic resin has excellent non-whitening properties with respect to external impact (strike), the thermoplastic resin may have an excellent appearance.

For example, when a sheet having a thickness of 0.15 mm is manufactured using a T-die extruder, the sheet is cut to a length of 100 cm, thickness is measured at 10 or more locations in an area except for an area within 2 to 3 cm from both ends of the sheet, and thickness deviation is calculated based on a difference between the maximum and minimum thicknesses, the thermoplastic resin composition may have a thickness deviation of 0.05 mm or less, preferably 0.03 mm or less, more preferably 0.001 to 0.03 mm. In this case, physical property balance, non-whitening properties, and extrusion moldability may be excellent.

As a specific example of performing extrusion using the T-die extruder to obtain a sheet, extrusion may be performed at an extrusion screw speed of 100 to 200 rpm, an extrusion temperature of 200 to 300° C., a 3-axis roll temperature of 80 to 90° C., and a roll rotation speed of 1 to 5 m/min using a T-die extruder to obtain a sheet having a thickness of 0.15 mm.

For example, ST32HS (twin screw, 32T, L/D=44) manufactured by Hankook E.M Company may be used as the T-die extruder.

In this description, the thickness may be measured using ABSOLUTE ID-C1012BS (Mitutoyo Co.).

The thermoplastic resin composition has excellent T-die extrusion processability. For example, when the thermoplastic resin composition is extruded at an extrusion screw speed of 150 to 200 rpm, an extrusion temperature of 200 to 300° C., a 3-axis roll temperature of 80 to 90° C., and a roll rotation speed of 2 to 4 m/min using a T-die extruder, a sheet may be obtained without tearing. In this case, physical property balance and non-whitening properties may be excellent, and excellent extrusion processability may be secured even at high roll rotation speed.

As a specific example of evaluating the T-die extrusion processability, extrusion may be performed at an extrusion screw speed of 150 to 200 rpm, an extrusion temperature of 200 to 300° C., a 3-axis roll temperature of 80 to 90° C., and a roll rotation speed of 2 to 4 m/min using a T-die extruder (ST32HS, twin screw, 32T, L/D=44, Hankook E.M Co.) to obtain a sheet having a thickness of 0.15 mm.

For example, when a sheet having a length of 30 cm is manufactured through calendering using a roll mill machine, thickness is measured at 10 or more locations in an area except for an area within 2 to 3 cm from both ends of the sheet, and thickness deviation is calculated based on a difference between the maximum and minimum thicknesses, the thermoplastic resin composition may have a thickness deviation of 0.05 mm or less, preferably 0.04 mm or less, more preferably 0.03 mm or less, still more preferably 0.005 to 0.03 mm. Within this range, sheet quality and physical property balance may be excellent, and processability during calendering may be excellent.

For example, the calendering may be performed at a temperature of two calendering rolls of 180 to 220° C. and a calendering roll speed of 8 to 12 rpm under the condition of roll-to-roll distance of 0.3 mm using a roll mill machine to manufacture a sheet having a thickness of 0.3 mm.

In the present invention, calendering may be performed using a roll mill machine (MR-LM0820, Mirae RPM Co.).

For example, the thermoplastic resin composition may have a tensile strength of 280 kgf/cm$^2$ or more, preferably 300 kgf/cm$^2$ or more, more preferably 300 to 600 kgf/cm$^2$, still more preferably 350 to 550 kgf/cm$^2$ as measured at a cross head speed of 50 mm/min using a specimen having a thickness of 3.2 mm according to ASTM D638. Within this range, physical property balance and non-whitening properties may be excellent.

For example, the thermoplastic resin composition may have an elongation of 47% or more, preferably 52% or more, more preferably 52 to 80%, still more preferably 55 to 75% as measured at a cross head speed of 50 mm/min using a specimen having a thickness of 3.2 mm according to ASTM D638. Within this range, physical property balance, processability, and non-whitening properties may be excellent.

When necessary, based on 100 parts by weight in sum of the graft copolymer (A) and the copolymer (B), the thermoplastic resin composition may further include 0.01 to 5 parts by weight, preferably 0.05 to 3 parts by weight, more preferably 0.1 to 2 parts by weight, still more preferably 0.2 to 1.5 parts by weight of each of one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

The heat stabilizer preferably includes a primary heat stabilizer and a secondary heat stabilizer.

The primary heat stabilizer is preferably a phenolic heat stabilizer, and more preferably includes one or more selected from the group consisting of 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,6-hexanediolbis-[3-(3,5-di-t-butyl-4-hydroxyphenyl)propionate], 2,2-thiodiehylenebis-[3-(3,5-di-t-butyl-4-hydroxyphenyl)propionate], 3,5-di-t-butyl-4-hydroxybenzylphosphonatediethyl ester, tris(2,6-dimethyl-3-hydroxy-4-t-butylbenzyl)isocyanurate, tris(3,5-di-t-butyl-4-hydroxybenzyl)isocyanurate, tris[(3,5-di-t-butyl-4-hydroxyphenyl)propionyloxyethyl]isocyanurate, tris(4-t-butyl-2,6-dimethyl-3-hydroxybenzyl)isocyanurate, 2,2'-methylenebis(4-methyl-6-t-butylphenol)terephthalate, 1,3,5-trimethyl-2,4,6-tris(3,5-di-t-butyl-4-hydroxybenzyl) benzene, 3,9-bis[1,1-dimethyl-2-{1-(3-t-butyl-4-hydroxy-5-methyl-phenyl)propionyloxy}ethyl]-2,4,8,10-tetraoxaspiro [5,5]undecane, 2,2-bis[4-(2-3,5-di-t-butyl-4-hydroxyhydrocinnamoyloxy)ethoxyphenyl]propane, and β-(3,5-di-t-butyl-4-hydroxyphenyl)propionic acid stearyl ester, still more preferably octadecyl 3-(3,5-ditert-butyl-4-hydroxyphenyl)propanoate (IR1076).

The secondary heat stabilizer is preferably a phosphorus heat stabilizer, and more preferably includes one or more selected from the group consisting of bis(diakylphenyl) pentaerythritol diphosphite ester, phosphite ester, trioctyl phosphite, trilauryl phosphite, tridecyl phosphite, (octyl) diphenyl phosphite, tris(2,4-di-t-butylphenyl) phosphite, triphenyl phosphite, tris(butoxyethyl)phosphite, tris(nonylphenyl) phosphite, distearylpentaerythritol diphosphite, tetra (tridecyl)-1,1,3-tris(2-methyl-5-t-butyl-4-hydroxy-phenyl) butane diphosphite, tetra(C12-C15 mixed alkyl)-4,4'-isopropylidenediphenyl diphosphite, tetra(tridecyl)-4,4'-butylidenebis(3-methyl-6-t-butylphenol)diphosphite, tris (mono- and di-mixed nonylphenyl)phosphite, hydrogenated 4,4'-isopropylidenediphenol polyphosphite, phenyl(4,4'-isopropylidenediphenol)pentaerythritol diphosphite, distearylpentaerythritol diphosphite, tris[4,4'-isopropylidenebis(2-t-butylphenol)]phosphite, di(isodecyl)phenyl phosphite, 4,4'- isopropylidenebis(2-t-butylphenol)bis(nonylphenyl) phosphite, bis(2,4-di-t-butyl-6-methylphenyl)ethyl phosphite, 2-[{2,4,8,10-tetra-t-butyldibenz[d,f][1.3.2]-dioxaphospepin-6-yl}oxy]-N,N-bis[2-[{2,4,8,10-tetra-t-butyl-dibenz[d,f][1.3.2]-dioxaphospepin-6-yl}oxy]ethyl]-ethanamine, and 6-[3-(3-t-butyl-4-hydroxy-5-methylphenyl)propoxy]-2,4,8,10-tetra-t-butyldibenz[d,f][1.3.2]-dioxaphospepin, still more preferably tris(2,4-di-tert-butylphenyl)phosphite (IF168).

The lubricant preferably includes one or more selected from the group consisting of an aliphatic amide-based lubricant, a fatty acid ester-based lubricant, and olefin-based wax.

The aliphatic amide-based lubricant preferably includes one or more selected from the group consisting of stearamide, oleamide, erucamide, ethylene bis stearamide, and ethylene bis oleamide.

The fatty acid ester-based lubricant preferably includes one or more selected from the group consisting of fatty acid esters of alcohols or polyhydric alcohols, hardened oil, butyl stearate, monoglyceride stearate, pentaerythritol tetrastearate, stearylstearate, ester wax, and alkyl phosphoric acid ester.

The olefin-based wax is preferably polyethylene wax.

For example, the light stabilizer may include one or more selected from the group consisting of a HALS-based UV stabilizer and a benzotriazole-based UV stabilizer, preferably a mixture of a HALS-based UV stabilizer and a benzotriazole-based UV stabilizer.

The HALS-based UV stabilizer preferably includes one or more selected from the group consisting of bis(2,2,6,6-tetramethyl-4-piperidinyl) sebacate (UV 770), bis[N-methyl-2,2,6,6-tetramethyl-4-piperidinyl]sebacate, and succinic acid dimethyl-1-(2-hydroxyethyl)-4-hydroxy-2,2,6,6-tetramethylpiperidine (Tinuvin 622), more preferably bis(2,2,6,6-tetramethyl-4-piperidinyl)sebacate (UV 770).

The benzotriazole-based UV stabilizer preferably includes one or more selected from the group consisting of 2-(2'-hydroxy-5'-t-octylphenyl)-benzotriazole (Cyasorb UV-541), 2-(2'-hydroxy-5'-methylphenyl)benzotriazole (Tinuvin-P), 2-(2'-hydroxy-3'-tert-butyl-5'-methylphenyl)-5-chloro-benzotriazole (Tinuvin-326), 2-(2'-hydroxy-3',5'-ditert-butylphenyl)-5-chloro-benzotriazole (Tinuvin-327), 2-(2'-hydroxy-3,5-ditert-amylphenyl)benzotriazole (Tinuvin-328), 2-(2'-hydroxy-3',5'-di(1,1-dimethylbenzyl)phenyl]-2H-benzotriazole (Tinuvin-234), 2-(2'-hydroxy-3',5'-di-t-butylphenyl)benzotriazole (Tinuvin-320), and 2-(2H-benzotriazole-2-yl)-4-(1,1,3,3-tetramethylbutyl)phenol (UV 329), more preferably 2-(2H-benzotriazole-2-yl)-4-(1,1,3,3-tetramethylbutyl)phenol (UV 329).

Method of Preparing Thermoplastic Resin Composition

A method of preparing the thermoplastic resin composition of the present invention includes a step of kneading and extruding, at 200 to 300° C. and 100 to 500 rpm, 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound copolymer (B) having a weight average molecular weight of 50,000 to 180,000 g/mol, wherein the thermoplastic resin composition has an alkyl acrylate coverage value (X) of 70% or more as calculated by Equation 1 below.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In this case, mechanical properties, such as impact strength, tensile strength, and elongation, transparency, colorability, and processability may be excellent. In particular, due to excellent non-whitening properties, occurrence of whitening during bending may be prevented.

The method of preparing the thermoplastic resin composition shares all the technical characteristics of the thermoplastic resin composition described above, and thus repeated description thereof will be omitted.

The kneading and extrusion step is preferably performed at 200 to 300° C. in a size of 10 to 199 pi, more preferably at 210 to 260° C. in a size of 20 to 80 pi, still more preferably at 220 to 250° C. in a size of 25 to 75 pi using an extrusion kneader. Within this range, extrusion may be performed stably, and kneading may be performed efficiently. At this time, the temperature is cylinder temperature, and the pi means the outer diameter of a screw (unit: mm).

Extrusion kneaders commonly used in the art to which the present invention pertains may be used without particular limitation, and a twin-screw extrusion kneader is preferably used.

Molded Article

A molded article of the present invention includes the thermoplastic resin composition. In this case, mechanical properties, such as impact strength, tensile strength, and flexural strength, surface hardness, transparency, and colorability may be excellent. In particular, due to excellent non-whitening properties, occurrence of whitening during bending may be prevented. Thus, a molded article having an aesthetically pleasing appearance may be manufactured, and the thermoplastic resin composition may be applied to manufacture of film or sheet products.

The molded article is preferably an injection-molded article, a calendering-molded article, or a T-die extrusion-molded article. In this case, in addition to mechanical properties, such as impact strength, tensile strength, and flexural strength, surface hardness, transparency, and colorability, non-whitening properties may be excellent.

The molded article is preferably a decorative sheet for finishing, a finishing material for outdoor construction materials, or a finishing material for roofs.

A method of manufacturing the molded article preferably includes a step of kneading and extruding, at 200 to 300° C. and 100 to 500 rpm, 35 to 75% by weight of an alkyl acrylate-aromatic vinyl compound-vinyl cyanide compound graft copolymer (A) containing alkyl acrylate rubber having an average particle diameter of 40 to 120 nm and 25 to 65% by weight of an aromatic vinyl compound-vinyl cyanide compound copolymer (B) having a weight average molecular weight of 50,000 to 180,000 g/mol to obtain an extrudate and a step of performing injection molding, calender molding, or T-die extrusion molding of the extrudate at a molding temperature of 180 to 300° C. to manufacture a molded article. In this case, mechanical properties, such as impact strength, tensile strength, and flexural strength, surface hardness, transparency, and colorability may be excellent. In particular, due to excellent non-whitening properties, occurrence of whitening during bending may be prevented.

For example, the extrudate may be in the form of pellets or in the form a plate.

In this description, the plate-like shape is not particularly limited when the plate-like shape is commonly defined as a plate-like shape in the technical field to which the present invention pertains, and may include, for example, a flat shape, a sheet shape, a film shape, and the like.

As a preferred example, the step of manufacturing a molded article may include a step of calender-molding the prepared extrudate at a calender temperature of 140 to 220° C. to obtain a sheet. In this case, processability may be excellent, and a sheet having a uniform surface may be easily manufactured.

In this description, calender molding is a process of rolling an extrudate using calendering equipment including calendering rolls. Without particular limitation, calender molding may be performed according to a method commonly used in the art to which the present invention pertains. Preferably, calender molding is performed according to a method including a step of mixing a sheet raw material at 130 to 200° C. using a mixer, a step of manufacturing a base sheet at 170 to 200° C. using the mixed raw material, and a step of manufacturing a sheet at 140 to 220° C. using the base sheet and calendering rolls. For example, the step of manufacturing a base sheet may be performed using a mixing roll.

As another preferred example, the method of manufacturing a molded article may include a step of injection-molding the prepared extrudate at an injection temperature of 200 to 260° C., an injection pressure of 60 to 100 bar, and a holding pressure of 25 to 55 bar. In this case, an injection-molded article having excellent mechanical properties such as impact strength may be easily manufactured.

The injection temperature is preferably 200 to 250° C., more preferably 210 to 240° C. Within this range, an injection-molded article having excellent mechanical properties such as impact strength may be easily manufactured.

The injection pressure is preferably 70 to 90 bar, more preferably 75 to 85 bar. Within this range, an injection-molded article having excellent mechanical properties such as impact strength may be easily manufactured.

The holding pressure is preferably 30 to 50 bar, more preferably 35 to 50 bar. Within this range, an injection-molded article having excellent mechanical properties such as impact strength may be easily manufactured.

As another preferred example, the step of manufacturing a molded article may include a step of performing T-die extrusion molding of the prepared extrudate at an extrusion temperature of 200 to 300° C., an extrusion screw speed of 50 to 200 rpm, a 3-axis roll temperature of 60 to 100° C., and a roll rotation speed of 1 to 5 m/min. In this case, processability may be excellent, and a sheet having a uniform surface may be easily manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

ASA graft copolymer (A-1): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 100 nm prepared by emulsion polymerization ASA graft copolymer (A-2): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 50 nm prepared by emulsion polymerization ASA graft copolymer (A-3): ASA graft copolymer (core: 37% by weight of butyl acrylate and 3% by weight of styrene, shell: 12% by weight of butyl acrylate, 37% by weight of styrene, and 11% by weight of acrylonitrile, grafting degree: 120%) containing alkyl acrylate rubber having an average particle diameter of 100 nm prepared by emulsion polymerization ASA graft copolymer (A-4): ASA graft copolymer (core: 32% by weight of butyl acrylate and 13% by weight of styrene, shell: 4% by weight of butyl acrylate, 40% by weight of styrene, and 11% by weight of acrylonitrile, grafting degree: 70%) containing alkyl acrylate rubber having an average particle diameter of 100 nm prepared by emulsion polymerization ASA graft copolymer (A-5): ASA graft copolymer (core: 30% by weight of butyl acrylate, shell: 12% by weight of butyl acrylate, 47% by weight of styrene, and 11% by weight of acrylonitrile, grafting degree: 70%) containing alkyl acrylate rubber having an average particle diameter of 100 nm prepared by emulsion polymerization ASA graft copolymer (A-6): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 150 nm prepared by emulsion polymerization ASA graft copolymer (A-7): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 30 nm prepared by emulsion polymerization SAN resin (B-1): 97HC (weight average molecular weight: 170,000 g/mol, LG Chemical Co.)

SAN resin (B-2): Acrylonitrile-styrene copolymer (weight average molecular weight: 30,000 g/mol, styrene: 75% by weight, acrylonitrile: 25% by weight) prepared by bulk polymerization SAN resin (B-3): Acrylonitrile-styrene copolymer (weight average molecular weight: 200,000 g/mol, styrene: 75% by weight, acrylonitrile: 25% by weight) prepared by bulk polymerization Examples 1 to 7 and Comparative Examples 1 to 8

According to the contents shown in Tables 1 and 2, the components shown in Tables 1 and 2 were fed into a twin-screw extruder. At this time, 1 part by weight of Pasflow7501 (Patechfine Chemical Co.) as a lubricant, 0.5 parts by weight of each of Irgonox 1076 (BASF Co.) and Irgafos 168 (BASF Co.) as antioxidants, and 0.5 parts by weight of each of Tinuvin 770 (BASF Co.) and Sunsorb 329 (Sunfine Global Co.) as UV stabilizers were fed into the twin-screw extruder. Then, melt-kneading and extrusion was performed at 230° C. and 150 rpm to prepare pellets. Then, the prepared pellets were injected at a molding temperature of 220° C., an injection pressure of 50 bar, and a holding pressure of 35 bar using an injection machine (VC 330/80 TECJ PRO, ENGEL Co.) to obtain a specimen for measuring appearance and physical properties. Using the specimen, impact strength, tensile strength, flexural strength, surface hardness, gloss, light transmittance, and haze were measured. In addition, using a T-die extruder (ST32HS (twin screw, 32T, L/D=44), Hankook E.M Co), the prepared pellets were extruded at a screw speed of 150 to 200 rpm, a temperature of 200 to 250° C., a 3-axis roll temperature of 80° C., and a roll rotation speed of 1.5 m/min to obtain a film having a thickness 0.15 T, and non-whitening properties according to impact induced by ball dropping were evaluated using the film.

Test Examples

The properties of injection specimens and extrusion specimens prepared in Examples 1 to 7 and Comparative Examples 1 to 8 were measured according to the following methods, and the results are shown in Tables 1 and 2 and FIG. 1.

Measurement Methods

Alkyl acrylate coverage value (%): Alkyl acrylate coverage value was calculated by Equation 1 below.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition. Here, the content of the alkyl acrylate in the gel was quantitatively measured through $^1$HNMR analysis or FT-IR analysis.

$^1$H NMR

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5s, TCE-d2, at room temperature

FT-IR

Equipment name: Agilent Cary 660

Measurement conditions: ATR mode

When measuring the gel content, 1 g of thermoplastic resin composition pellets was added to 30 g of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the gel content was measured and calculated by Equation 2 below.

$$\text{Gel content(\%)}=[\text{Weight (g) of insoluble matter (gel)/Weight (g) of sample}]\times 100 \quad \text{[Equation 2]}$$

Grafting degree (%): 0.5 g of a powdered graft copolymer was added to 50 ml of acetone, stirred at room temperature for 12 hours, and centrifuged to separate insoluble matter that was not dissolved in acetone, followed by drying for 12 hours. The weight of the insoluble matter was measured, and grafting degree was calculated by Equation 3 below.

$$\text{Grafting degree(\%)}=[\text{Weight (g) of grafted monomers/Rubber weight(g)}]\times 100 \quad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

Specifically, when measuring the weight (g) of insoluble matter (gel), 0.5 g of a powdered graft copolymer was added to 50 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the weight of the insoluble matter (gel) was measured.

Izod impact strength (kgf·cm/cm): Izod impact strength was measured at room temperature using an injection specimen (thickness: ¼") according to ASTM D256.

Tensile strength (kgf/cm$^2$): Tensile strength was measured at a cross head speed of 50 mm/min using an injection specimen (thickness: 3.2 mm) according to ASTM D638.

Elongation (%): Elongation was measured at a cross head speed of 50 mm/min using an injection specimen (thickness: 3.2 mm) according to ASTM D638.

Non-whitening properties according to impact induced by ball dropping: A 1 kg weight was vertically dropped onto a T-die extrusion film having dimensions of 0.15 mm×10 cm×10 cm in thickness, width, and length from a height of 25 cm using a Gardner impact tester. Then, whether whitening occurred in a portion of the film hit by the weight was determined by visual observation, and occurrence of whitening was evaluated according to the following criteria.

○: No whitening occurs, indicating that non-whitening properties are excellent.

X: Whitening clearly occurs, indicating that non-whitening properties are poor.

Haze difference (Δhaze) according to ball dropping: A 1 kg weight was vertically dropped onto a T-die extrusion film having dimensions of 0.15 mm×10 cm×10 cm in thickness, width, and length from a height of 25 cm using a Gardner impact tester. Then, haze values before and after impact at a portion of the film hit by the weight were measured according to ASTM D1003, and haze difference was calculated by Equation 4 below.

$$\text{Haze difference(}\Delta\text{haze)}=\text{Haze value after ball dropping}-\text{haze value before ball dropping} \quad \text{[Equation 4]}$$

Thickness deviation (mm) after calendering: Using a roll mill machine (MR-LM0820, Mirae RPM Co.) in which two calendering rolls having a diameter of 30 cm were installed at an interval of 0.3 mm, calendering of an extruded thermoplastic resin composition in pellet form was performed while maintaining the temperature of the rolls at 180 to 210° C. to obtain a sheet having a thickness of 0.3 mm. Then, thickness was measured at 10 or more locations in an area except for an area within 2 to 3 cm from both ends of the obtained sheet having a length of 30 cm, and thickness deviation was calculated based on a difference between the maximum and minimum thicknesses. At this time, thickness was measured using ABSOLUTE ID-C1012BS (Mitutoyo Co.).

Thickness deviation (mm) after T-die extrusion: Using a T-die extruder (ST32HS (twin screw, 32T, L/D=44), Hankook E.M Co.), T-die extrusion was performed at a screw speed of 150 to 200 rpm, a temperature of 200 to 250° C., a 3-axis roll temperature of 80° C., and a roll rotation speed of 1.5 m/min to obtain a sheet having a thickness of 0.15 mm. The sheet was cut to a length of 100 cm, thickness was measured at 10 or more locations in an area except for an area within 2 to 3 cm from both ends of the sheet, and thickness deviation was calculated based on a difference between the maximum and minimum thicknesses. At this time, thickness was measured using ABSOLUTE ID-C1012BS (Mitutoyo Co.).

Gloss: Gloss was measured at 45° using a gloss meter according to ASTM D2457.

TABLE 1

| Classification (parts by weight) | Example 1 | Example 2 | Example 3 | Example 4 | Example 5 | Example 6 | Example 7 |
|---|---|---|---|---|---|---|---|
| ASA (A-1) | 40 | 50 | 60 | 70 | | | |
| ASA (A-2) | | | | | 50 | | |
| ASA (A-3) | | | | | | 50 | |
| ASA (A-4) | | | | | | | 50 |
| SAN (B-1) | 60 | 50 | 40 | 30 | 50 | 50 | 50 |
| Rubber particle diameter (nm) of ASA (A) | 100 | 100 | 100 | 100 | 50 | 100 | 100 |
| Grafting degree (%) of ASA (A) | 70 | 70 | 70 | 70 | 70 | 120 | 70 |
| Alkyl acrylate coverage value (%) | 90 | 90 | 90 | 90 | 90 | 89 | 123 |
| Physical properties | | | | | | | |
| Impact strength (kgf · cm/cm) | 5 | 6 | 6.5 | 7.5 | 3.5 | 5.5 | 4 |
| Tensile strength (kgf/cm$^2$) | 500 | 450 | 370 | 310 | 450 | 450 | 300 |
| Elongation (%) | 50 | 55 | 65 | 70 | 55 | 55 | 80 |
| Non-whitening properties according to impact induced by ball dropping | ◯ | ◯ | ◯ | ◯ | ◯ | ◯ | ◯ |
| Haze difference (Δhaze) | 4.5 | 3.5 | 2.5 | 2 | 3 | 3.5 | 1.5 |
| Thickness deviation (mm) after extrusion | 0.01 | 0.01 | 0.01 | 0.01 | 0.01 | 0.01 | 0.01 |
| Thickness deviation (mm) after calendering | 0.01 | 0.01 | 0.01 | 0.01 | 0.01 | 0.01 | 0.01 |
| Gloss | 105 | 102 | 100 | 95 | 100 | 110 | 100 |

TABLE 2

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| ASA (A-1) | 30 | 20 | 80 | | | | 50 | 50 |
| ASA (A-5) | | | | 50 | | | | |
| ASA (A-6) | | | | | 50 | | | |
| ASA (A-7) | | | | | | 50 | | |
| SAN (B-1) | 70 | 80 | 20 | 50 | 50 | 50 | | |
| SAN (B-2) | | | | | | | 50 | |
| SAN (B-3) | | | | | | | | 50 |
| Rubber particle diameter (nm) of ASA (A) | 100 | 100 | 100 | 100 | 150 | 30 | 100 | 100 |
| Grafting degree (%) of ASA (A) | 70 | 70 | 70 | 70 | 70 | 70 | 70 | 70 |
| Alkyl acrylate coverage value (%) | 90 | 90 | 90 | 52 | 90 | 90 | 90 | 90 |
| Physical properties | | | | | | | | |
| Impact strength (kgf · cm/cm) | 3.5 | 2.5 | 8 | 8 | 9 | 1.5 | 6 | 6 |
| Tensile strength (kgf/cm$^2$) | 550 | 600 | 250 | 450 | 450 | 450 | 450 | 450 |

TABLE 2-continued

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Elongation (%) | 45 | 25 | 100 | 60 | 55 | 55 | 60 | 50 |
| Non-whitening properties according to impact induced by ball dropping | X | X | ○ | X | X | ○ | ○ | ○ |
| Haze difference (Δhaze) | 15 | 25 | 1.5 | 40 | 40 | 2.5 | 3.5 | 3.5 |
| Thickness deviation (mm) after extrusion | 0.01 | 0.01 | 0.02 | 0.01 | 0.01 | 0.01 | 0.1 | 0.1 |
| Thickness deviation (mm) after calendering | 0.01 | 0.01 | 0.02 | 0.01 | 0.01 | 0.01 | 0.1 | 0.1 |
| Gloss | 110 | 120 | 90 | 90 | 80 | 105 | 120 | 75 |

As shown in Tables 1 and 2, compared to Comparative Examples 1 to 8 outside of the present invention, in the case of Examples 1 to 7 according to the present invention, mechanical properties such as impact strength, tensile strength, and flexural strength were excellent, haze difference was small, non-whitening properties were excellent, and thickness deviation after extrusion or calendering was small. In the case of Comparative Examples 1 and 2 including the ASA resin (A) in an amount less than the range of the present invention, mechanical properties such as impact strength deteriorated, and whitening occurred. In the case of Comparative Example 3 including the ASA resin (A) in an amount exceeding the range of the present invention, tensile strength was reduced, and gloss was poor.

In addition, in the case of Comparative Example 4 in which the grafting degree of the ASA resin (A) was high, but the alkyl acrylate coverage value was less than the range of the present invention, whitening occurred, haze difference was significantly increased, and gloss was poor.

In addition, in the case of Comparative Example 5 in which the ASA resin (A) included rubber having an average particle diameter exceeding the range of the present invention, whitening occurred, haze difference was large, and gloss was poor. In the case of Comparative Example 6 in which the ASA resin (A) included rubber having an average particle diameter less than the range of the present invention, impact strength was greatly reduced.

In addition, in the case of Comparative Examples 7 and 8 including the aromatic vinyl compound-vinyl cyanide compound copolymer (B) having a weight average molecular weight outside the range of the present invention, due to poor processability, the thickness deviation of a sheet was increased after T-die extrusion or calendering.

In addition, as shown in FIG. 1 below, compared to Comparative Example 4, it can be seen that Example 2 according to the present invention has excellent non-whitening properties even when a strong impact is applied.

The invention claimed is:

1. A thermoplastic resin composition, comprising:
   35 to 75% by weight of an alkyl acrylate-aromatic vinyl compound-vinyl cyanide compound graft copolymer (A) containing alkyl acrylate rubber having an average particle diameter of 40 to 120 nm; and
   25 to 65% by weight of a first aromatic vinyl compound-vinyl cyanide compound copolymer (B) having a weight average molecular weight of 50,000 to 180,000 g/mol,
   wherein the thermoplastic resin composition has an alkyl acrylate coverage value (X) of 70% or more as calculated by Equation 1 below:

$$X=\{(G-Y)/Y\}\times 100, \quad \text{[Equation 1]}$$

wherein G represents a content (wt %) of a gel based on a total weight of the thermoplastic resin composition, and Y represents a content (wt %) of the alkyl acrylate in the gel based on the total weight of the thermoplastic resin composition,
   wherein the graft copolymer (A) comprises 20 to 60% by weight of alkyl acrylate rubber (a-1) and 40 to 80% by weight of an aromatic vinyl compound-vinyl cyanide compound copolymer (a-2),
   wherein the copolymer (a-2) further includes alkyl acrylate,
   wherein the gel content is measured using acetone as a solvent,
   wherein based on 100% by weight in total of the alkyl acrylate rubber (a-1), the alkyl acrylate rubber (a-1) includes an aromatic vinyl compound in an amount of 5 to 30% by weight, and
   wherein based on 100% by weight in total of the copolymer (a-2), the copolymer (a-2) comprises 60 to 75% by weight of an aromatic vinyl compound, 15 to 22% by weight of a vinyl cyanide compound, and 5 to 22% by weight of alkyl acrylate.

2. The thermoplastic resin composition according to claim 1, wherein the graft copolymer (A) has a grafting degree of 60% or more as calculated by Equation 3 below:

$$\text{Grafting degree}(\%)=[\text{Weight (g) of grafted monomers/Rubber weight(g)}]\times 100, \quad \text{[Equation 3]}$$

wherein:
the weight (g) of grafted monomers is obtained by subtracting the rubber weight (g) from a weight of the gel, the gel is obtained by dissolving the graft copolymer (A) in acetone and performing centrifugation, and
the rubber weight (g) is a weight (g) of rubber components added during polymerization.

3. The thermoplastic resin composition according to claim 1, wherein the copolymer (B) comprises
55 to 85% by weight of the aromatic vinyl compound and 15 to 45% by weight of the vinyl cyanide compound.

4. The thermoplastic resin composition according to claim 1, wherein the thermoplastic resin composition has an Izod impact strength of 4.5 kgf cm/cm or more as measured at room temperature according to ASTM D256 for a specimen having a thickness of ¼".

5. The thermoplastic resin composition according to claim 1, wherein:
the thermoplastic resin composition is in a form of an extruded film having dimensions of 0.15 mm×10 cm×10 cm in thickness, width, and length, respectively, and when a 1 kg weight is vertically dropped onto the film from a height of 25 cm using a Gardner impact tester, haze values before and after impact are measured for a portion of the film hit by the weight according to ASTM D1003, a difference in the haze values before and after the impact is calculated, and a haze difference is 10 or less.

6. The thermoplastic resin composition according to claim 1, wherein:
the thermoplastic resin composition is in a form of a T-die extruded sheet having a thickness of 0.15 mm, and
when the sheet is cut to a length of 100 cm, the thickness is measured at 10 or more locations in an area except for an area within 2 to 3 cm from both ends of the sheet, thickness deviation is calculated based on a difference between maximum and minimum thicknesses, and the thickness deviation is 0.05 mm or less.

7. The thermoplastic resin composition according to claim 1, wherein:
the thermoplastic resin composition is in a form of a calendered sheet having a length of 30 cm, and
when thickness of the sheet is measured at 10 or more locations in an area except for an area within 2 to 3 cm from both ends of the sheet, thickness deviation is calculated based on a difference between maximum and minimum thicknesses, and the thickness deviation is 0.05 mm or less.

8. The thermoplastic resin composition according to claim 1, further comprising one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent.

9. A molded article, comprising the thermoplastic resin composition according to claim 1.

10. The molded article according to claim 9, wherein the molded article is an injection-molded article, a calender-molded article, or an extrusion-molded article.

\* \* \* \* \*